Feb. 13, 1945.   I. E. COFFEY   2,369,535
PIVOTAL MOUNTING
Filed March 16, 1943

INVENTOR
IRVEN E. COFFEY
ATTORNEY

Patented Feb. 13, 1945

2,369,535

UNITED STATES PATENT OFFICE 2,369,535

PIVOTAL MOUNTING

Irven E. Coffey, Normandy, Mo., assignor to Carter Carburetor Corporation, St. Louis, Mo., a corporation of Delaware Application March 16, 1943, Serial No. 479,309

8 Claims. (Cl. 308—63)

This invention relates to pivotal mountings of the type in which the weight of a tilting member or lever is carried by a pivot pin.

Where a pivot pin of the above type is subjected to substantial bearing forces, there is, of course, a tendency for the pin to wear out of round in its bearing. For instance, in mechanically operated fuel pumps for automobiles, the pump is usually operated from a rotating engine operated cam by means of a pivoted lever. Since the pumping force is applied laterally to the pivot pin, this pin is normally subjected to considerable wear which, eventually, may substantially alter the functioning of the pump. Moreover, the pin bearing in the support may be more substantial than the lever bearing making it desirable to cause the pin to journal in the former rather than the latter bearing without rigidly mounting the pin in the lever.

The object of the present invention is to arrange such a pivotal mounting so that the bearing pressure is distributed evenly about the bearing surfaces of the pivotal pin and the life of the pin consequently increased.

Another object is to provide means to enforce rotation of the pivot pin in the support bearings rather than the lever during a major portion of the lever stroke.

These and other objects are attained by providing a strap-like device which frictionally engages the pin during a major portion of the lever stroke so as to rotate the pin and which is relaxed from its frictional engagement with the pin during the remainder of the stroke.

In the accompanying drawing which illustrates the invention,

Figure 1:
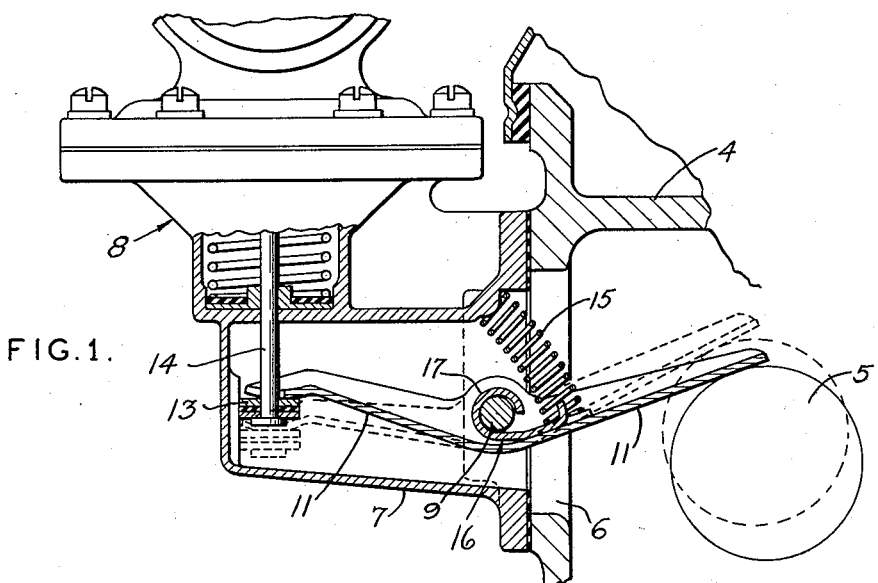
Fig. 1 is a vertical cross section illustrating the operating parts of a mechanical fuel pump of the type conveniently utilized for supplying fuel to an automotive engine.
Figure 2:
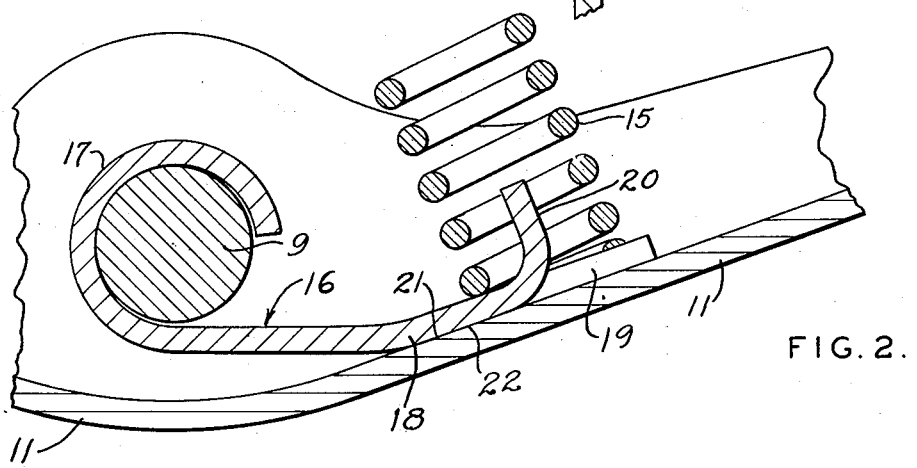
Fig. 2 is an enlarged detail of the structure in Fig. 1, similarly in vertical transverse section
Figure 3:
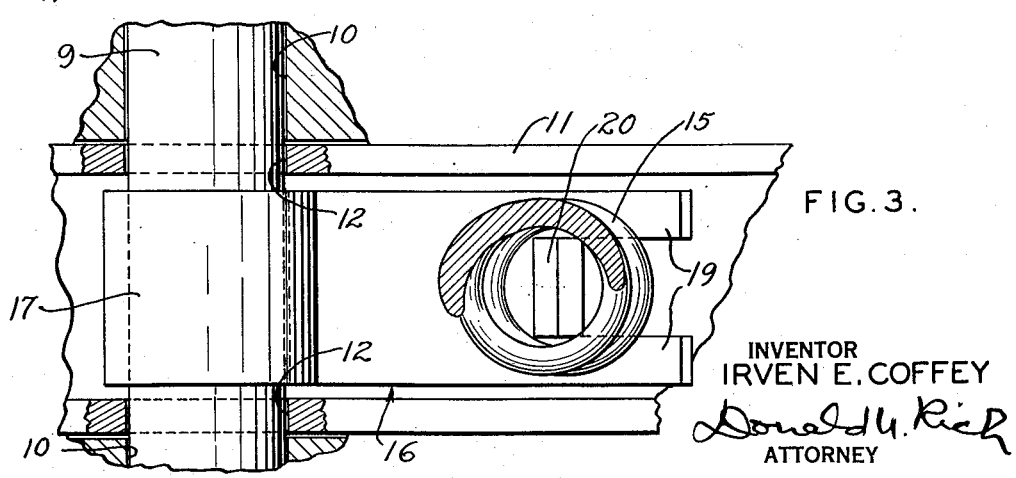
Fig. 3 is a top view of the detail in Fig. 2, the spring being sectioned and parts of the support bearings being shown in section.

In Fig. 1 there is shown a structural part 4 of an internal combustion engine enclosing an engine operated cam 5 adjacent an opening 6 in the side wall of the part. A housing 7 is bolted or otherwise secured to the part 4 about opening 6 and supports a fuel pump, generally indicated at 8. A pivot pin 9 is journalled in suitable bearings 10 in housing 7 and pivotally supports a lever 11 in bearings 12, the lever having one end tangentially engaging cam 5 and the other end resting upon a washer 13 carried at the lower extremity of pump operating stem 14. A coiled spring 15, compressed between the upper wall of housing 7 and lever 11, constantly urges the lever in a clockwise direction against cam 5. By means of this arrangement, rotation of cam 5 by the engine causes oscillation of lever 11 and reciprocation of stem 14 to produce the pumping action.

The arrangement causes the application of substantial lateral pressures on pivot pin 9 and bearings 10 and 12. In order to distribute this pressure evenly about the surface of the pin, a small metal strap 16 has a curved element 17 at one end, described about a circle of a radius slightly larger than the radius of the pin. This element extends partly around the pin and normally rests against it. The strap also includes a portion 18 which extends along lever 11 away from the pin and has bifurcations 19 at its outer extremity with an upwardly bent lip 20 therebetween. Bifurcations 19 form a seat for the lower extremity of coiled spring 15 and lip 20 extends thereinto. Spring 15 extends perpendicular to the general plane of lever 11 but disaligned from the radius of oscillation. More particularly, the line of application of spring pressure is at a right angle to engaging surfaces 21 and 22 of strap 16 and the lever when the lever is in an intermediate position.

Thus, when the lever is below this position, as shown in full lines in Fig. 1, the spring bears at an acute angle against the strap and causes curved element 17 on the strap to frictionally grip the pin. When the lever is above this position, the line of spring pressure is at a larger angle. When the pin is gripped by the strap, the pin is caused to rotate with the lever, and relative to the more substantial support bearings 10. The position of the lever when the spring bears thereagainst at a right angle, in other words, the centered position of the lever relative to the spring, is preferably nearer one end of the stroke than the other so that during the major portion of the cycle, rotational wear will occur in the support bearings rather than the relatively small lever bearings.

Furthermore, I have found that because of the spring enforced frictional engagement of surfaces 21 and 22 at the centered position, the point of gripping of the pin during the clockwise stroke is different than the point of release during the opposite stroke so that the pin will rotate farther in one direction than in the other during each stroke. The pin thus progresses around its axis so that lateral forces in the bearings are applied evenly over the whole bearing surfaces of the pin.

The invention may be modified in various respects as will occur to those skilled in the art and the exclusive use of all modifications as come within the scope of the appended claims is contemplated.

I claim:

1. Means to increase the life of a pivotal mounting comprising the combination with a support, a lever, and a pivot pin having bearings in said support and said lever, of a device having a portion curved about said pin and another portion extending along said lever, and a spring normally urging said device into frictional contact with said pin and said lever whereby said pin will be rotated with said lever during at least a portion of the oscillation thereof.

2. Means to increase the life of a pivotal mounting comprising the combination with a support member, a pivoting member, and a pivotal pin having bearings in both of said members, of a device having an element curved about said pin and a portion extending away from said pin and along said pivoting member, and a spring stressed against said portion but disaligned from the radius of said pivoting member whereby upon oscillation of said pivoting member said device will be intermittently urged into frictional engagement with said pin to rotate the same with said pivoting member.

3. The combination with a support, a tilting member, and a pivot pin having bearings in said support and said member, of a device having an element curved about said pin, and a spring pressed against said device and said tilting member at such an angle that upon movement of said latter member to one position said spring will urge said device frictionally against said pin to rotate the same, and upon movement of said device to another position such frictional engagement will be relaxed.

4. The combination with a support, a tilting member, and a pivot pin having bearings in said support and said member, of a strap having a portion extending away from said pin and a curved element opposing said pin and described upon a circle of a slightly larger radius than said pin, and a spring urging said portion against said member and said pin so that upon oscillation of said member in one portion of its stroke said strap will frictionally grip said pin for rotating the same in its bearings, and during oscillation of said member in another part of its stroke said device will be released from said pin.

5. The combination with a support, an oscillating member, and a pin pivotally supporting said member and having bearings in both said support and said member, of a strap device having a curved element at least partly encompassing said pin and a part lying against said oscillating member, and a spring urging said device against said member along a line at a right angle to the engaging surfaces of said device and said member when said member is in a predetermined intermediate position whereby said spring will cause said device to alternately grip and release and thereby intermittently rotate said pin during oscillation of said member.

6. The combination with a support, an oscillating member, and a pivot pin having bearings in said support and said member, of a strap device having a portion curved about said pin and another portion lying against a surface of said member, and a spring urging said device against said member at substantially a right angle to the engaging surfaces of said device and member in an intermediate position of said member whereby upon oscillation of said member the angles of application of spring pressure passes over center to cause said device to alternately grip and release said pin and intermittently enforce rotation of said pin with said member.

7. The combination specified in claim 6 in which the frictional engagement of said device against said oscillating member is sufficient to cause said device to grip and release said pin at different points in its cycle so that the pin will be caused to rotate farther in one direction than in the other during each cycle.

8. The combination with a support, a lever, and a pivot pin having bearings in said support and said member, of means enforcing intermittent rotation of said lever in one direction, a spring alternately causing rotation of said lever in the other direction, and a strap device having a portion curved about said pin and a second portion interposed between said spring and said oscillating member, said spring applying force to said device at a right angle to the engaging surfaces between said member and said device in an intermediate position of said member whereby the line of spring pressure passes over center during each cycle and said device is thereby caused alternately to grip and release said pin and enforce intermittent rotation of said pin with said member.

IRVEN E. COFFEY.